US011300858B2

(12) United States Patent
Chen (10) Patent No.: US 11,300,858 B2
(45) Date of Patent: Apr. 12, 2022

(54) ADJUSTABLE OPTICAL MODULE AND PROJECTOR

(71) Applicant: Coretronic Corporation, Hsin-Chu (TW)

(72) Inventor: Yii-Wen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/160,416

(22) Filed: Jan. 28, 2021

(65) Prior Publication Data

US 2021/0247670 A1  Aug. 12, 2021

(30) Foreign Application Priority Data

Feb. 7, 2020 (CN) .......................... 202010082203.5

(51) Int. Cl.
*G03B 21/14* (2006.01)
*G02B 7/00* (2021.01)

(52) U.S. Cl.
CPC .......... *G03B 21/142* (2013.01); *G02B 7/003* (2013.01)

(58) Field of Classification Search
CPC ...... G03B 21/142; G02B 7/003; G02B 7/022; G02B 7/023
USPC ........................................... 353/101, 119, 98
See application file for complete search history.

(56) References Cited

U.S. PATENT DOCUMENTS

| 4,832,452 A * | 5/1989 | Eisler ................... G01M 11/04 359/813 |
| 11,221,548 B2 * | 1/2022 | Chen .................. G03B 21/2053 |
| 2009/0047009 A1 * | 2/2009 | Nagano ................... G03B 5/00 396/55 |
| 2010/0045945 A1 | 2/2010 | Tseng |
| 2021/0223495 A1 * | 7/2021 | Chen ..................... G02B 7/1822 |
| 2021/0247669 A1 * | 8/2021 | Chen .................... G03B 21/142 |

FOREIGN PATENT DOCUMENTS

| CN | 1462917 | 12/2003 |
| CN | 1834711 | 9/2006 |
| CN | 201034110 | 3/2008 |
| CN | 101221347 | 7/2008 |

(Continued)

OTHER PUBLICATIONS

"Office Action of China Counterpart Application", dated Dec. 27, 2021, p. 1-p. 17.

*Primary Examiner* — William C. Dowling
(74) *Attorney, Agent, or Firm* — JCIPRNET (57) ABSTRACT

The disclosure provides an adjustable optical module, including an optical element, a carrier, a frame, two first positioning members, a base, and two second positioning members. One of the carrier and the frame includes two first pivot shafts that protrude from both sides and extend along a first axis, and the other includes two first pivot holes. The two first pivot shafts are located in the two first pivot holes, respectively. One of the frame and the base includes two second pivot shafts that protrude from both sides and extend along a second axis, and the other includes two second pivot holes. The two second pivot shafts are located in the two second pivot holes, respectively. The disclosure provides a projector, including a light source module, a light valve, a projection lens, and the foregoing adjustable optical module.

26 Claims, 10 Drawing Sheets

(56) References Cited

FOREIGN PATENT DOCUMENTS

| | | |
|---|---|---|
| CN | 101400238 | 4/2009 |
| CN | 102403143 | 4/2012 |
| CN | 202434379 | 9/2012 |
| CN | 206320554 | 7/2017 |
| CN | 211375286 | 8/2020 |
| CN | 211375294 | 8/2020 |
| JP | 2000250115 | 9/2000 |
| JP | 2003177289 | 6/2003 |
| JP | 2003228132 | 8/2003 |
| JP | 2006086024 | 3/2006 |
| JP | 2018054940 | 4/2018 |
| TW | 201006356 | 2/2010 |
| TW | 201039043 | 11/2010 |
| TW | 201206611 | 2/2012 |
| TW | 201207880 | 2/2012 |
| TW | 201414904 | 4/2014 |

\* cited by examiner

ADJUSTABLE OPTICAL MODULE AND PROJECTOR

CROSS-REFERENCE TO RELATED APPLICATION

This application claims the priority benefit of China application serial no. 202010082203.5, filed on Feb. 7, 2020. The entirety of the above-mentioned patent application is hereby incorporated by reference herein and made a part of this specification.

BACKGROUND

Technical Field

The disclosure relates to an optical module and a projector, and in particular, to an adjustable optical module and projector.

Description of Related Art

In an existing adjustable optical module, a pivot shaft is used with a pivot hole between a carrier and a frame of an optical element of such adjustable optical module to attain pivot joining. Since the pivot shaft needs to be rotatable within the pivot hole, the size of the pivot hole needs to be larger than the size of the pivot shaft, so as to insert the pivot shaft. In this case, there is a gap between the pivot shaft and the pivot hole. During a vibration test or a drop test, due to the gap between the pivot shaft and the pivot hole, the carrier of the optical element may be displaced along a radial direction relative to the frame, causing optical variation.

SUMMARY

The disclosure provides an adjustable optical module that may prevent a pivot shaft between a carrier and a frame of an optical element from being displaced along a radial direction relative to a pivot hole.

The disclosure provides a projector including the foregoing adjustable optical module. Other objectives and advantages of the disclosure may be further known from technical features disclosed in the disclosure.

In order to achieve one, a part of, or all of the foregoing objectives, or other objectives, according to an embodiment of the disclosure, the adjustable optical module includes an optical element, a carrier, a frame, two first positioning members, a base, and two second positioning members. The carrier is configured to carry the optical element. One of the carrier and the frame includes two first pivot shafts that protrude from both sides and extend along a first axis, and the other includes two first pivot holes, the two first pivot shafts being located in the two first pivot holes, respectively. The two first positioning members are located on the first axis and press against both ends of the two first pivot shafts. One of the frame and the base includes two second pivot shafts that protrude from both sides and extend along a second axis, and the other includes two second pivot holes, the two second pivot shafts being located in the two second pivot holes, respectively. The two second positioning members are located on the second axis and press against both ends of the two second pivot shafts.

According to another embodiment of the disclosure, a projector includes a light source module, a light valve, a projection lens, and an adjustable optical module. The light source module is configured to emit an illuminating light beam. The light valve is configured to convert the illuminating light beam into an image light beam. The projection lens is configured to project the image light beam. The adjustable optical module is disposed on a path of the illuminating light beam or on a path of the image light beam. The adjustable optical module includes an optical element, a carrier, a frame, two first positioning members, a base, and two second positioning members. The carrier is configured to carry the optical element. One of the carrier and the frame includes two first pivot shafts that protrude from both sides and extend along a first axis, and the other includes two first pivot holes, the two first pivot shafts being located in the two first pivot holes, respectively. The two first positioning members are located on the first axis and press against both ends of the two first pivot shafts. One of the frame and the base includes two second pivot shafts that protrude from both sides and extend along a second axis, and the other includes two second pivot holes, the two second pivot shafts being located in the two second pivot holes, respectively. The two second positioning members are located on the second axis and press against both ends of the two second pivot shafts.

Based on the foregoing, according to the adjustment optical module of the disclosure, the two first positioning members are disposed on the first axis and press against both ends of the two first pivot shafts to maintain the positions of the two first pivot shafts relative to the first pivot holes. In this way, the two first pivot shafts do not move along the radial direction within the two first pivot holes. Similarly, the two second positioning members are disposed on the second axis and press against both ends of the two second pivot shafts, and both ends of the two first positioning members and the two first pivot shafts to maintain the positions of the two second pivot shafts relative to the two second pivot holes. In this way, the two second pivot shafts do not move along a radial direction within the two second pivot holes. In this way, according to the adjustable optical module of the disclosure, the pivot shaft may be effectively prevented from moving or shaking relative to the pivot hole along the radial direction due to the greater size of the pivot hole being greater than the size of the pivot shaft. Therefore, the adjustable optical module of the disclosure can provide a favorable optical effect.

BRIEF DESCRIPTION OF THE DRAWINGS

Drawings serve to further understand the disclosure, and the drawings are incorporated in and constitute a part of the specification. The drawings illustrate embodiments of the disclosure and serve to explain the principles of the disclosure together with the description.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
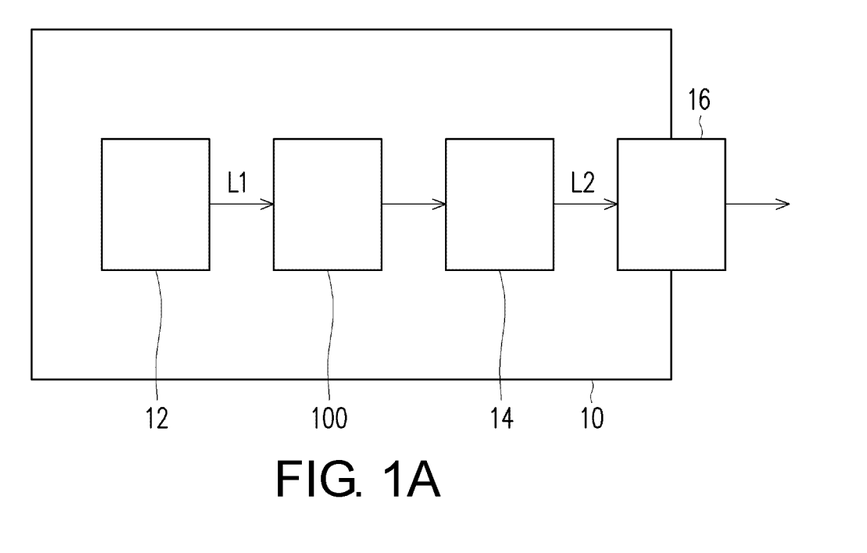
FIG. 1A is a schematic view of a projector according to an embodiment of the disclosure.

FIG. 1A is a schematic view of a projector according to an embodiment of the disclosure. Referring to FIG. 1A, a projector 10 in the embodiment includes a light source module 12, a light valve 14, a projection lens 16, and an adjustable optical module 100. The light source module 12 is configured to emit an illuminating light beam L1. In the embodiment, the light source module 12 includes, for example, a laser light source, but in other embodiments, the light source module 12 may also include a light emitting diode or other light sources. Light emitted by the light source module 12 is, for example, blue light, but may also be light beams of other colours, which is not limited in the disclosure. For example, the light source module 12 may include a plurality of laser elements (not shown), such laser elements, for example, being arranged in an array, and the laser elements being, for example, laser diodes (LD). In other embodiments, there may be a plurality of light source modules 12. In other embodiments, the light source module 12 may be, for example, a solid-state illumination source including a light emitting diode. The light source module 12 may further include other optical elements, such as a phosphor wheel and the like, and the descriptions thereof are omitted herein.

In the embodiment, the adjustable optical module 100 is disposed on a path of the illuminating light beam L1. For example, the adjustable optical module 100 is disposed between the light source module 12 and the light valve 14 to adjust a light path of the illuminating light beam L1, but a position of the adjustable optical module 100 is not limited thereto.

In the embodiment, the light valve 14 is configured to convert the illuminating light beam L1 into an image light beam L2. In the embodiment, the light valve 14 is, for example, a reflective light modulator such as a digital micro-mirror device (DMD) or a liquid crystal on silicon panel (LCoS panel). In some embodiments, the light valve 14 may be, for example, penetrated optical modulators such as a penetrated liquid crystal display panel, an electro-optic modulator, a magneto-optic modulator, and an acousto-optic modulator (AOM). However, a type of the light valve 14 are not limited in the disclosure.

In the embodiment, the projection lens 16 is configured to project the image light beam L2. The projection lens 16 is located on a transmission path of the image light beam L2 and may project the image light beam L2 out of the projector 10 to display an image on a screen, a wall surface, or other projection targets. In the embodiment, the projection lens 16 includes, for example, a combination of one or more non-planar optical lenses with diopter, for example, various combinations of non-planar lenses such as a biconcave lens, a biconvex lens, a concave-convex lens, a convex-concave lens, a plano-convex lens, and a plano-concave lens. In an embodiment, the projection lens 16 may further include a planar optical lens to project the image light beam L2 from the light valve 14 out of the projector 10 in a reflective or penetrating manner. A pattern and a type of the projection lens 16 are not limited in the disclosure.

Figure 1B:
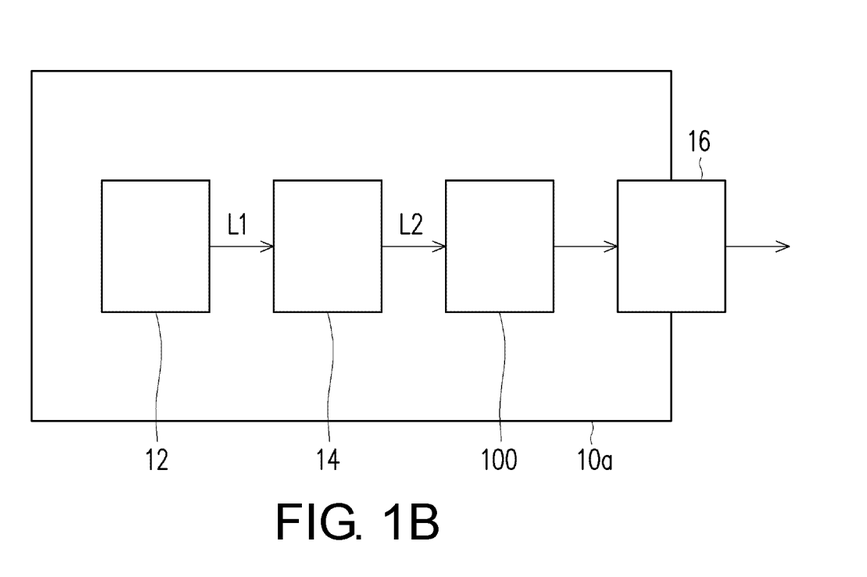
FIG. 1B is a schematic view of a projector according to another embodiment of the disclosure.

FIG. 1B is a schematic view of a projector according to another embodiment of the disclosure. Referring to FIG. 1B, a main difference between a projector 10a of FIG. 1B and the projector 10 of FIG. 1A is a position of the adjustable optical module 100. In the embodiment, the adjustable optical module 100 is disposed on a path of the image light beam L2. That is to say, the adjustable optical module 100 is disposed between the light valve 14 and the projection lens 16 to adjust an optical path of the image light beam L2.

In the foregoing embodiments, the adjustable optical module 100 may be designed to prevent a pivot shaft from moving or shaking relative to a pivot hole along a radial direction, thereby providing a good optical effect. The adjustable optical module 100 is described in detail below.

Figure 2:
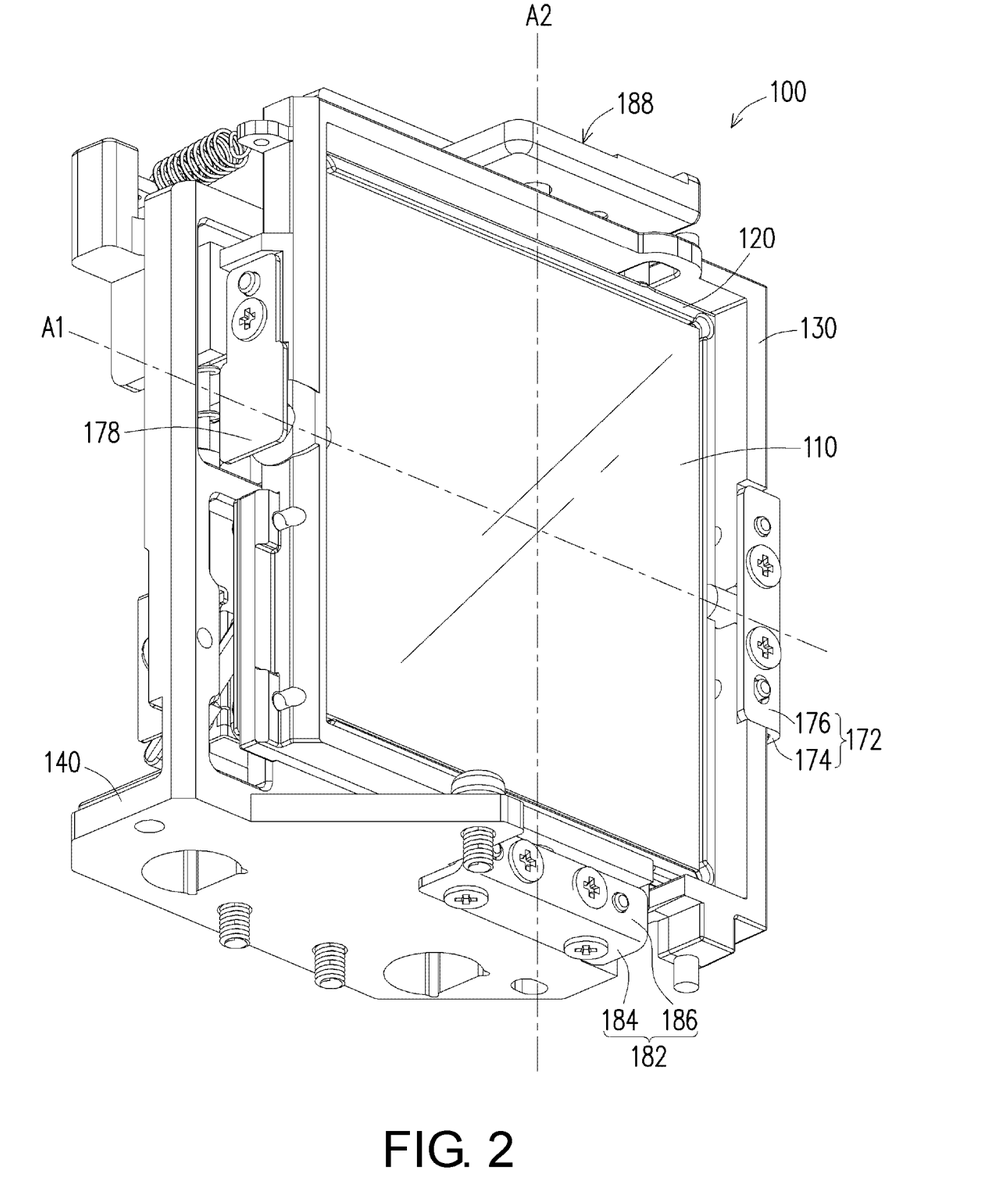
FIG. 2 is a schematic view of an adjustable optical module according to an embodiment of the disclosure.
Figure 3:
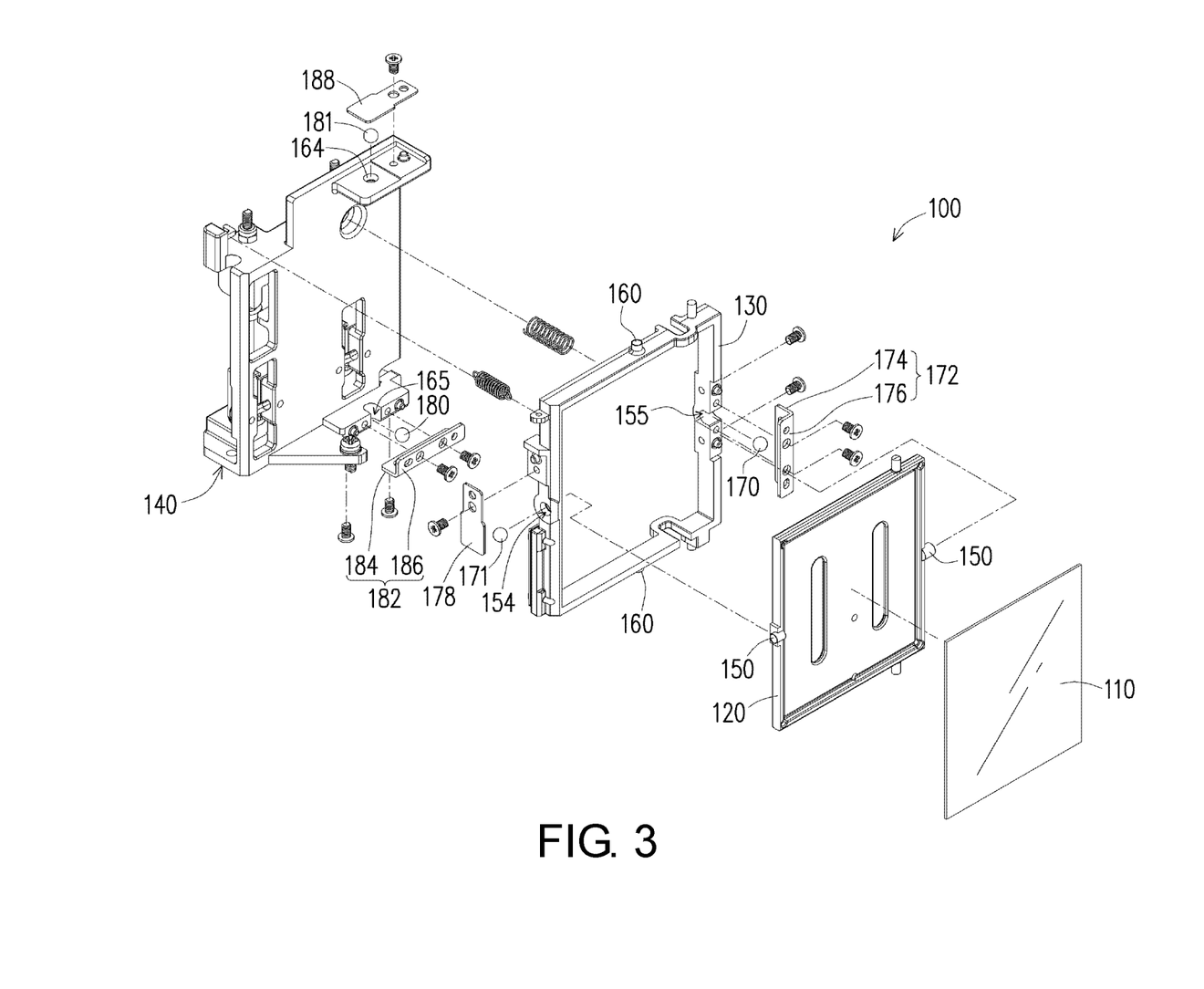
FIG. 3 is an exploded schematic view of the adjustable optical module of FIG. 2.
Figure 4:
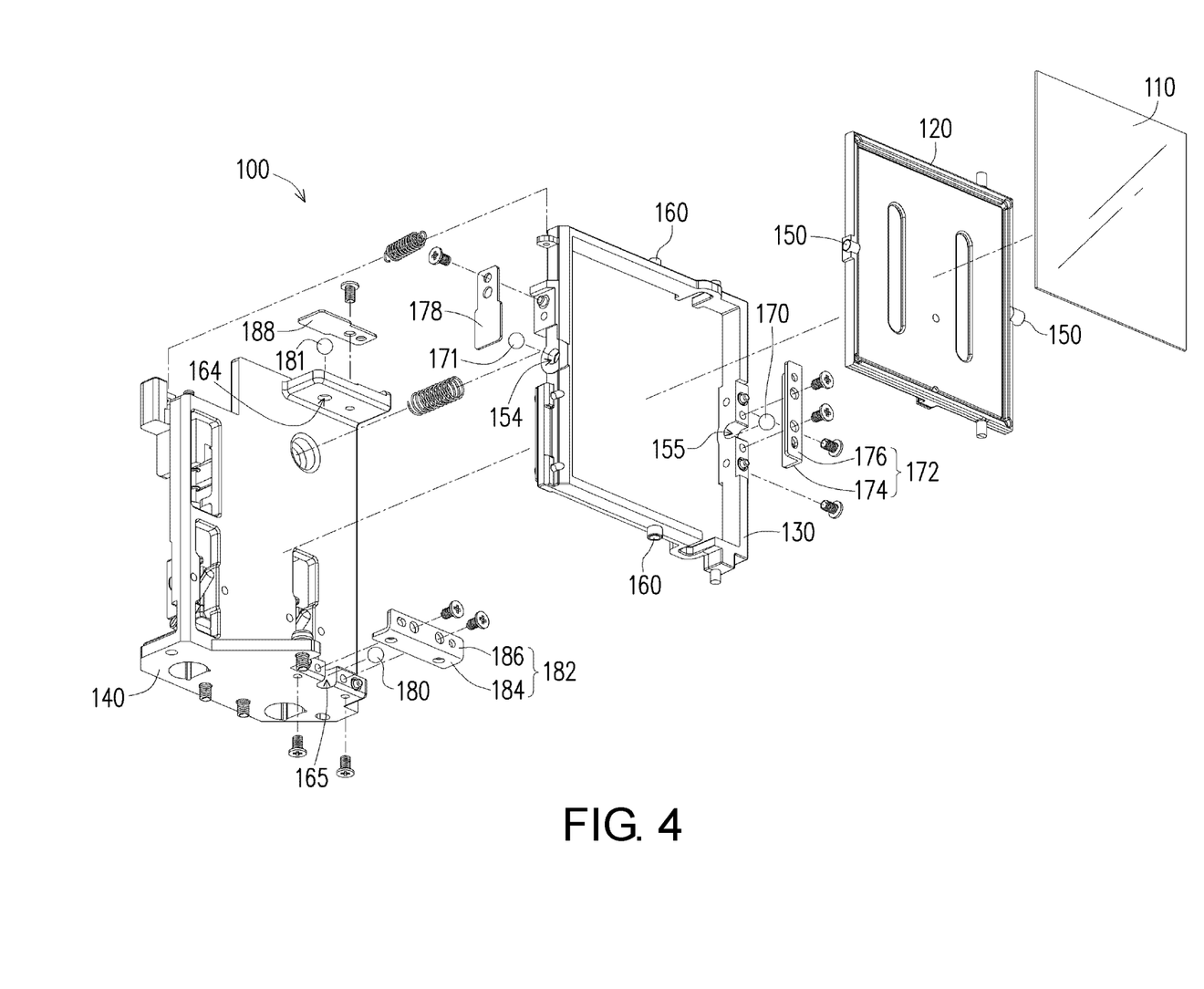
FIG. 4 is a schematic view of FIG. 3 from another perspective.

FIG. 2 is a schematic view of an adjustable optical module according to an embodiment of the disclosure. FIG. 3 is an exploded schematic view of the adjustable optical module of FIG. 2. FIG. 4 is a schematic view of FIG. 3 from another perspective. Referring to FIG. 2 to FIG. 4, the adjustable optical module 100 includes an optical element 110, a carrier 120, a frame 130, two first positioning members 170, 171 (FIG. 3), a base 140, and two second positioning members 180, 181 (FIG. 3). The optical element 110 is, for example, a lens, a dichroic mirror, or a reflecting mirror, but a type of the optical element 110 is not limited thereto.

In the embodiment, the carrier 120 is configured to carry the optical element 110. The carrier 120 is located in the frame 130 and is pivotally connected to the frame 130 along a first axis A1. In particular, one of the carrier 120 and the frame 130 includes two first pivot shafts 150 (FIG. 3) protruding from both sides and extending along the first axis A1 (FIG. 2, the two first pivot shafts 150 are located on the first axis A1, for example), and the other thereof includes two first pivot holes 154 and 155 (through hole, for example). When the carrier 120 and the frame 130 are assembled together, the two first pivots 150 may be disposed in the two first pivot holes 154 and 155, respectively. In an embodiment shown in FIG. 3, the carrier 120 includes two first pivot shafts 150 protruding from both sides and extending along the first axis A1, and the frame 130 includes two first pivot holes 154 and 155. However, the disclosure is not limited thereto. In other embodiments, the frame 130 may include two first pivot shafts 150 protruding inward from both sides toward the carrier 120 and extending along the first axis A1, and the carrier 120 may include two first pivot holes 154, 155.

In the embodiment, it may be seen from FIG. 3 that one of the two first pivot holes 154 and 155 is an annular hole with closed edges, and the other is a horseshoe-shaped hole with non-closed edges, such as a U-shaped hole. In particular, in FIG. 3, the first pivot hole 154 on a left side of the frame 130 is an annular hole with closed edges, and the first pivot hole 155 on a right side of the frame 130 is a horseshoe-shaped hole with non-closed edges, but the disclosure is not limited thereto.

In the foregoing embodiment, shapes of the first pivot holes 154 and 155 are designed to allow an assembler to first insert the first pivot shaft 150 on the left side of the carrier 120 shown in FIG. 3 into the first pivot hole 154 (the annular hole) on the left side of the frame 130, and then insert the first pivot shaft 150 on the right side of the carrier 120 into the first pivot hole 155 (the horseshoe-shaped hole) on the right side of the frame 130 when assembling the carrier 120 to the frame 130, thereby increasing assembly convenience. In addition, the shapes of the first pivot holes 154 and 155 may prevent deformation of the pivot shafts due to assembly.

In addition, in the embodiment, the frame 130 is pivotally connected to the base 140 along a second axis A2. For example, one of the frame 130 and the base 140 includes two second pivot shafts 160 (FIG. 3) protruding from both sides and extending along the second axis A2 (FIG. 2, the two second pivot shafts 160 are located on the second axis A2, for example), and the other includes two second pivot holes 164 and 165 (through hole, for example). When the frame 130 and the base 140 are assembled together, the two second pivot shafts 160 may be located in the two second pivot holes 164 and 165, respectively. In an embodiment shown in FIG. 3, the frame 130 includes two second pivot shafts 160 protruding from both sides and extending along the second axis A2, and the base 140 includes two second pivot holes 164, 165. However, the disclosure is not limited thereto. In other embodiments, the base 140 may include two second pivot shafts 160 protruding inwardly from both sides toward the frame 130 and extending along the second axis A2, and the frame 130 may include two second pivot hole 164, 165. Similarly, one of the two second pivot holes 164 and 165 is an annular hole with closed edges, and the other is a horseshoe-shaped hole with non-closed edges to facilitate assembly and prevent deformation of the second pivot shaft 160 during assembly. In the embodiment, the first axis A1 is perpendicular to the second axis A2.

It is worth mentioning that, in the embodiment, the two first positioning members 170 and 171 are located on the first axis A1 and press against both ends of the two first pivot shafts 150. The two second positioning members 180 and 181 are located on the second axis A2 and press against ends of the two second pivot shafts 160, respectively.

Figure 5:
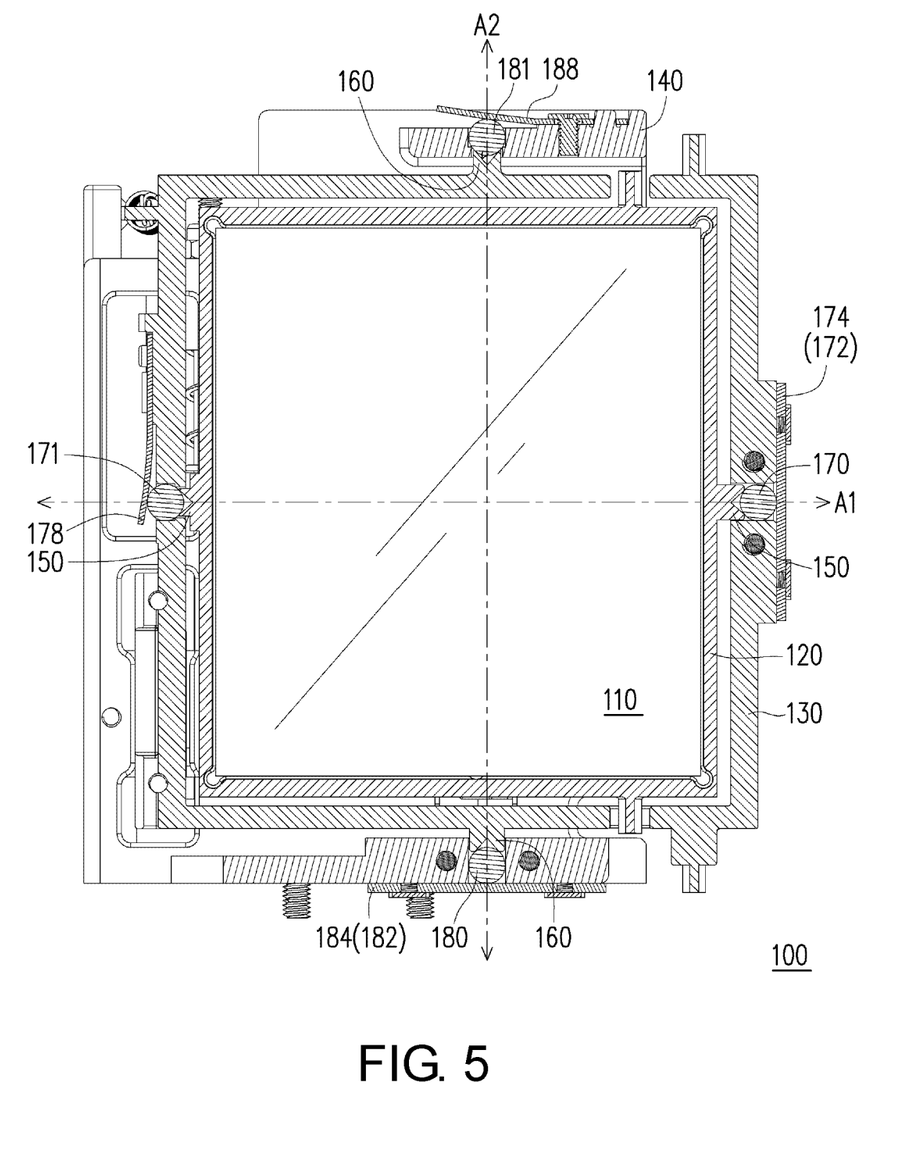
FIG. 5 is a schematic cross-sectional view of the adjustable optical module of FIG. 2.
Figure 6:
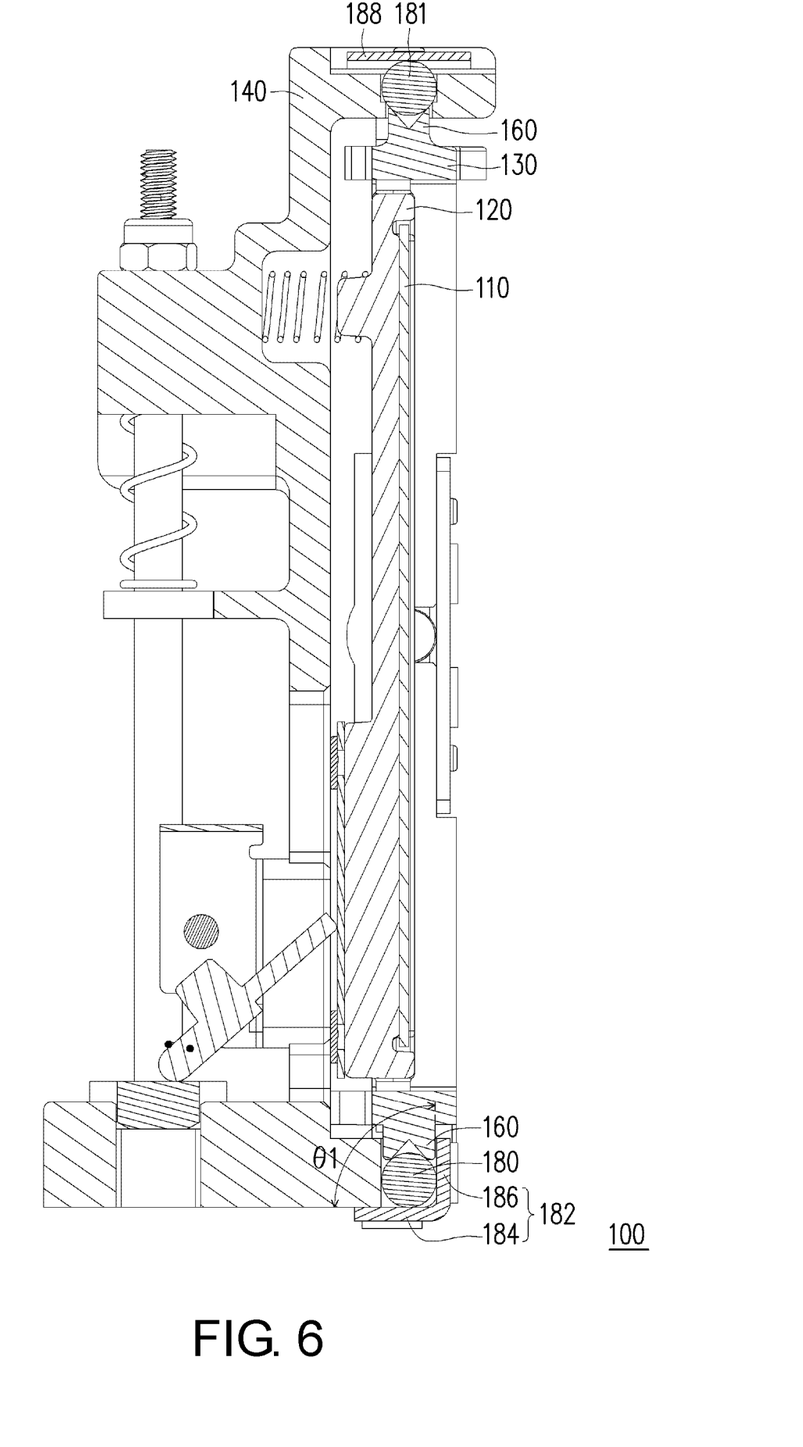
FIG. 6 is a schematic cross-sectional view of the adjustable optical module of FIG. 2 around a second axis.
Figure 7:
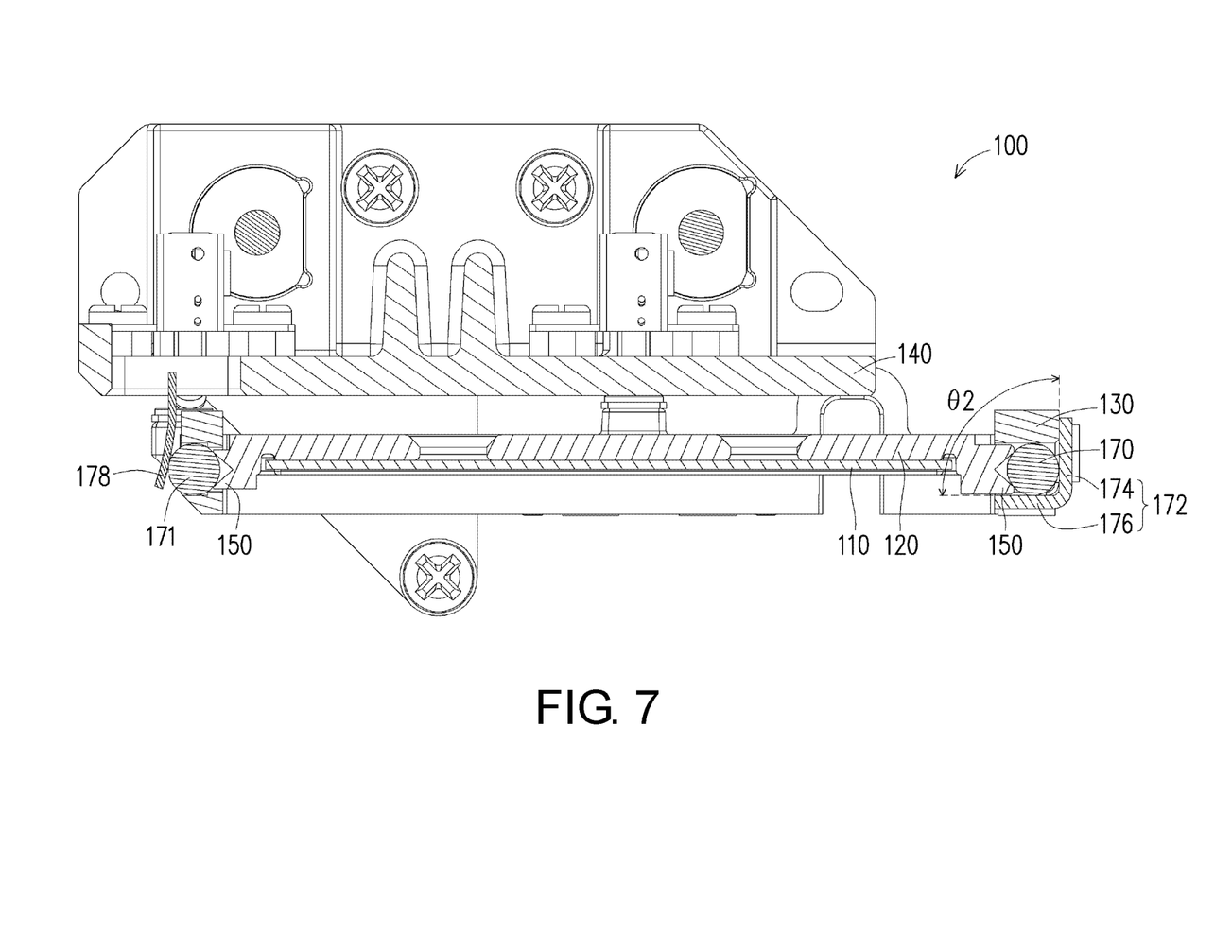
FIG. 7 is a schematic cross-sectional view of the adjustable optical module of FIG. 2 around a first axis.

FIG. 5 is a schematic cross-sectional view of the adjustable optical module of FIG. 2. FIG. 6 is a schematic cross-sectional view of the adjustable optical module of FIG. 2 along the second axis. FIG. 7 is a schematic cross-sectional view of the adjustable optical module of FIG. 2 along the first axis. Referring to FIG. 5 to FIG. 7, in the embodiment, the adjustable optical module 100 disposes the two first positioning members 170 and 171 on the first axis A1 and press against both ends of the two first pivot shafts 150 to maintain positions of the two first pivot shafts 150 relative to the two first pivot holes 154, 155, so that the two first pivot shafts 150 do not move along a radial direction of the first pivot holes 154 and 155 within the first pivot holes 154 and 155. Similarly, the two second positioning members 180 and 181 are disposed on the second axis A2 and press against both ends of the two second pivot shafts 160 to maintain positions of the two second pivot shafts 160 relative to the two second pivot holes 164 and 165, so that the two second pivot shafts 160 do not move along a radial direction of the two second pivot holes 164 and 165 within the two second pivot holes 164 and 165.

In this way, according to the adjustable optical module 100 of the disclosure, the pivot shaft may be effectively prevented from moving or shaking relative to the pivot hole along the radial direction when an inner diameter of the pivot hole is greater than an outer diameter of the pivot shaft. Therefore, the adjustable optical module 100 of the disclosure can provide a good optical effect.

In the embodiment, the first positioning members 170, 171 and/or the second positioning members 180, 181 are sphere-shaped, such as a steel ball, but materials and shapes of the first positioning members 170, 171 and the second positioning members 180, 181 are not limited thereto. The first positioning members 170 and 171 are sphere-shaped to reduce a contact area between the first positioning members 170, 171 and the first pivot shaft 150 (such as line contact or point contact, but not limited thereto), so that a friction between the first positioning member and the first pivot shaft is reduced to prevent rotation of the first pivot shaft 150. The second positioning members 180 and 181 are sphere-shaped to reduce a contact area between the second positioning members 180, 181 and the second pivot shaft 160 (such as line contact or point contact, but not limited thereto), so that a friction between second positioning member and the second pivot shaft is reduced to prevent rotation of the second pivot shaft 160.

In the embodiment, it may be seen from FIG. 3, FIG. 5, and FIG. 7 that the adjustable optical module 100 further includes a first fixing member 172 and a first cantilever 178. For example, in an embodiment shown in FIG. 3, the first fixing member 172 is fixed to the frame 130 or the carrier 120 having the first pivot hole 155, and the first fixing member 172 is aligned with the first pivot hole 155, the first positioning member 170 is located between the first fixing member 172 and the corresponding first pivot shaft 150, and the first fixing member 172 presses the first positioning member 170 against an end of the corresponding first pivot 150. In addition, one end of the first cantilever 178 is fixed to the frame 130 or the carrier 120 having the first pivot hole 154, and the first cantilever 178 is aligned with the first pivot hole 154, and the first positioning member 171 is located between the first cantilever 178 and the corresponding first pivot shaft 150, and the first cantilever 178 presses the first positioning member 171 against the end of the corresponding first pivot shaft 150. However, the disclosure is not limited thereto. In other embodiments, the first fixing member 172 may be also disposed corresponding to the first pivot hole 154, and the first cantilever 178 may be disposed corresponding to the first pivot hole 155.

In particular, in the embodiment shown in FIG. 3, the first fixing member 172 is disposed on the frame 130, and one end of the first cantilever 178 is fixed to the frame 130.

In the adjustable optical module 100 of the embodiment, both ends of the first fixing member 172 are fixed to the frame 130, and a single end of the first cantilever 178 is fixed to the frame 130, thereby pushing against the first positioning members 170, 171. Due to a mechanical manufacturing tolerance of the elements (for example, the frame 130), if both of the two first pivot shafts 150 use, for example, the first fixing member 172, to press against the two first positioning members 170, 171, a tolerance between the elements may result in an assembly failure or assembly difficulty. Similarly, if both of the first pivot shafts 150 use, for example, the first cantilever 178, to press against the two first positioning members 170 and 171, the carrier 120 may achieve a larger range of adjustment, resulting in easy shaking of the frame 130 and a difficulty in achieving a high-precision adjustment.

In the embodiment, the two first pivot shafts 150 enables the carrier 120 to move appropriately around the first axis A1 in the frame 130 by respectively using the first fixing member 172 and the first cantilever 178, the fixed first fixing member 172 and the elastically deformable first cantilever 178, so that a high-precision adjustment may be achieved. The first cantilever 178 is, for example, a flexible plate.

It may be seen from FIG. 2 and FIG. 7 that, in the embodiment, the first fixing member 172 includes a first plate 174 and a second plate 176 in bent connection. An included angle θ2 (as shown in FIG. 7) between the first plate 174 and the second plate 176 is between 70 degrees and 90 degrees, and the first plate 174 and the second plate 176 of the first fixing member 172 are pressed against the first positioning member 170. A range of the included angle θ2 allows the first plate 174 and the second plate 176 to provide a clamping force for the first positioning member 170, so that the first positioning member 170 is more firmly pressed against an end of the first pivot shaft 150. Definitely, the included angle θ2 between the first plate 174 and the second plate 176 is not limited thereto.

In the embodiment, it may be seen from FIG. 3, FIG. 5, and FIG. 6 that the adjustable optical module 100 further includes a second fixing member 182 and a second cantilever 188. For example, in an embodiment shown in FIG. 3, the second fixing member 182 is fixed to the frame 130 or the base 140 having the second pivot hole 165, and the second fixing member 182 is aligned with the second pivot hole 165. The second positioning member 180 is located between the second fixing member 182 and the corresponding second pivot shaft 160, and the second fixing member 182 presses the second positioning member 180 against the end of the corresponding second pivot shaft 160. For example, one end of the second cantilever 188 is fixed to the frame 130 or the base 140 having the second pivot hole 164, and the second cantilever 188 is aligned with the two second pivot holes 164. The second positioning member 181 is located between the second cantilever 188 and the corresponding second pivot shaft 160, and the second cantilever 188 presses the second positioning member 181 against an end of the corresponding second pivot shaft 160. However, the disclosure is not limited thereto. In other embodiments, the second fixing member 182 may be disposed corresponding to the second pivot hole 164, and the second cantilever 188 may be disposed corresponding to the first pivot hole 165. The second cantilever 188 is, for example, a flexible plate.

In particular, in the embodiment shown in FIG. 3, the second fixing member 182 is disposed on the base 140, and one end of the second cantilever 188 is fixed to the base 140.

In the embodiment, an advantage of a combination of the second fixing member 182 with the second cantilever 188 is similar to an advantage of a combination of the first fixing member 172 with the first cantilever 178, and the descriptions thereof are omitted herein.

Figure 8A:
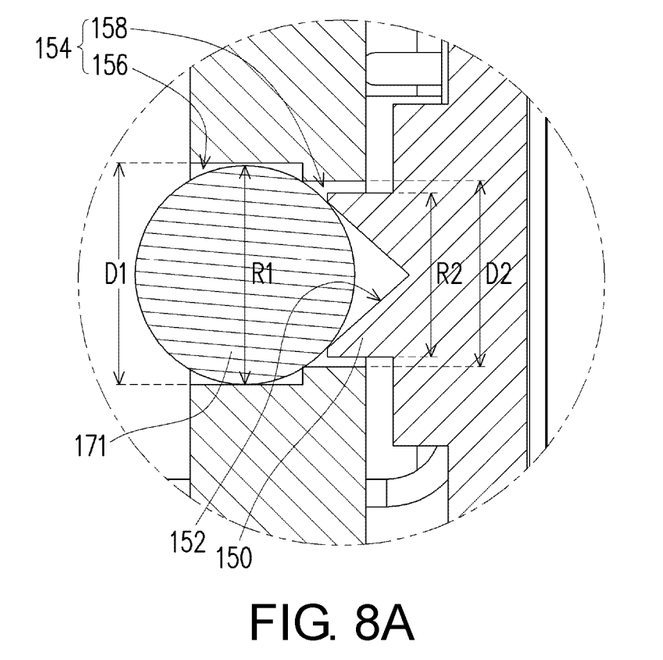
FIG. 8A and FIG. 8B are schematic partially-enlarged views of FIG. 5.
Figure 8B:
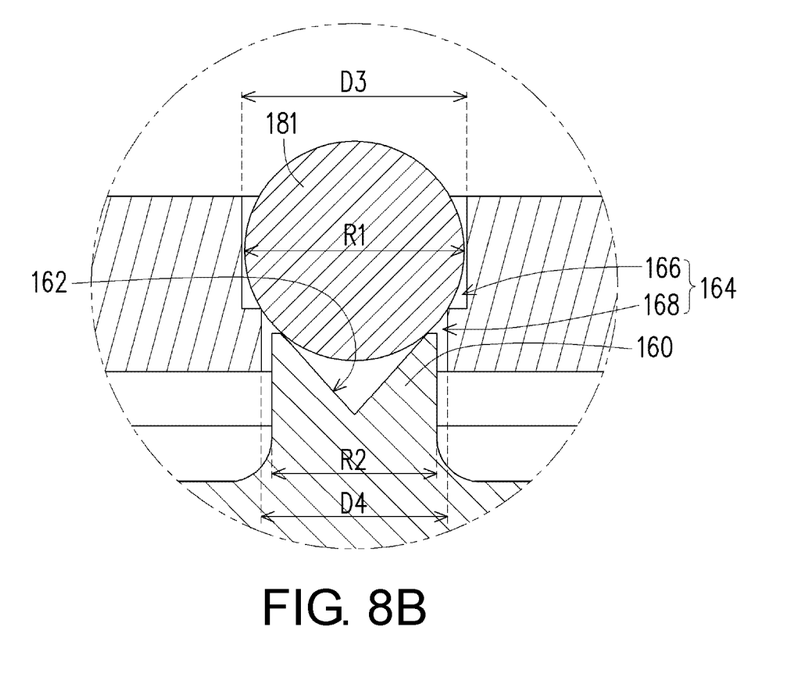

It may be seen from FIG. 2 and FIG. 6 that, in the embodiment, the second fixing member 182 includes a third plate 184 and a fourth plate 186 in bent connection. An included angle θ1 (shown in FIG. 6) between the third plate 184 and the fourth plate 186 is between 70 degrees and 90 degrees, and the third plate 184 and the fourth plate 186 of the second fixing member 182 press against the second positioning member 180. A range of the included angle θ1 allows the third plate 184 and the fourth plate 186 to provide a clamping force for the second positioning member 180, so that the second positioning member 180 is more firmly pressed against the end of the second pivot shaft 160. Definitely, the included angle θ1 between the third plate 184 and the fourth plate 186 is not limited thereto. FIG. 8A and FIG. 8B are schematic partially-enlarged views of FIG. 5. Referring to FIG. 8A, FIG. 8A is a partially enlarged diagram of the first positioning member 171 in FIG. 5, and the first cantilever 178 is omitted therein. FIG. 8B is a partially enlarged diagram of the second positioning member 181 in FIG. 5, and the second cantilever 188 is omitted therein. In the embodiment, a first pivot hole 154 is a stepped hole (or a funnel-shaped hole, in other embodiment) in a depth direction, and the first positioning member 171 is located in the first pivot hole 154. For example, in the embodiment, the first pivot hole 154 is a stepped hole in the depth direction and includes a first hole section 156 and a second hole section 158, the first hole section 156 and the second hole section 158 having a first inner diameter D1 and a second inner diameter D2, respectively. The first positioning member 171 corresponding to the first pivot hole 154 is located in the first pivot hole 154. An outer diameter R1 of the first positioning member 171 is less than the first inner diameter D1 of the first hole section 156 and greater than the second inner diameter D2 of the second hole section 158. It may be seen from FIG. 8A that, in the embodiment, the first positioning member 171 is in linear (ring, for example) contact with the first pivot hole 154 on an inner wall face between the first hole section 156 and the second hole section 158.

In addition, an outer diameter R2 of the first pivot shaft 150 is less than the second inner diameter D2 of the second hole section 158 of the first pivot hole 154, and the first pivot shaft 150 is located in the second hole section 158 of the first pivot hole 154. In an embodiment shown in FIG. 8A, an end of the first pivot shaft 150 has a first recess 152, the first positioning member 171 is partially located in the first recess 152, the first recess 152 being a funnel-shaped groove, and the first positioning member 171 is in linear contact with the first recess 152 to reduce a friction between the first pivot shaft 150 and the first positioning member 171.

Referring to FIG. 8B, in the embodiment, the second pivot hole 164 is a stepped hole or a funnel-shaped hole in a depth direction, and the second positioning member 181 is located in the second pivot hole 164. For example, in the embodiment, the second pivot hole 164 is a stepped hole in the depth direction, and includes a third hole section 166 and a fourth hole section 168, the third hole section 166 and the fourth hole section 168 having a third inner diameter D3 and a fourth inner diameter D4, respectively. The second positioning member 181 corresponding to the second pivot hole 164 is located in the second pivot hole 164. The outer diameter R1 of the second positioning member 181 is less than the third inner diameter D3 of the third hole section 166 and greater than the fourth inner diameter D4 of the fourth hole section 168. It may be seen from FIG. 8B that, in the embodiment, the second positioning member 181 is in linear contact with an inner wall face of the second pivot hole 164.

The outer diameter R2 of the second pivot shaft 160 is less than the fourth inner diameter D4 of the fourth hole section 168 of the second pivot hole 164, and the second pivot shaft 160 is located in the fourth hole section 168 of the second pivot hole 164. In an embodiment shown in FIG. 8B, an end of the second pivot shaft 160 has a second recess 162. The second positioning member 181 is partially located in the second recess 162. The second recess 162 is a funnel-shaped groove. The second positioning member 181 is in linear contact with the second recess 162 to reduce a friction between the second pivot shaft 160 and the second positioning member 181.

Figure 9A:
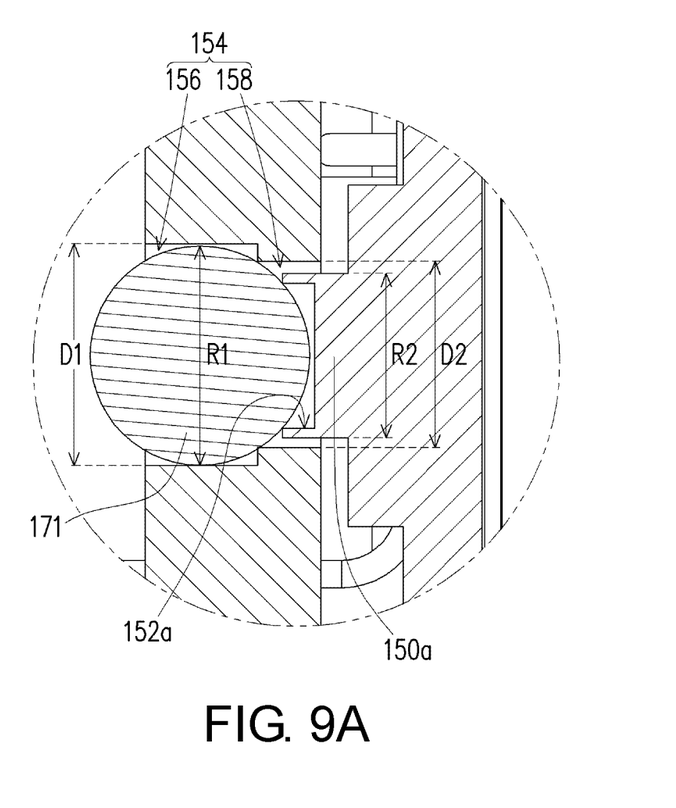
FIG. 9A is a schematic partial cross-sectional view of an adjustable optical module according to another embodiment of the disclosure.
Figure 9B:
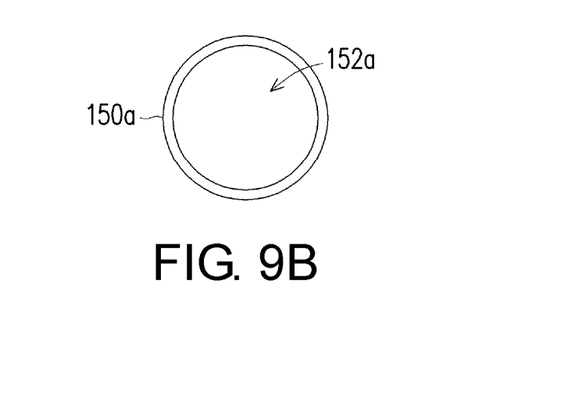
FIG. 9B is schematic view of a first pivot shaft of FIG. 9A along an axial direction.

FIG. 9A is a schematic partial cross-sectional view of an adjustable optical module according to another embodiment of the disclosure. FIG. 9B is schematic view of a first pivot shaft of FIG. 9A along an axial direction. Referring to FIG. 9A and FIG. 9B, a difference between FIG. 8A and FIG. 9A is a shape of the recess of the first pivot shaft. In the embodiment, a first recess 152a of the first pivot shaft 150a is a circular groove. In an embodiment that is not drawn, a second recess of a second pivot shaft may also be a circular groove. In an embodiment shown in FIG. 9A, the first recess 152a may be in linear contact with a first positioning member 171 to reduce a friction between the first pivot shaft 150a and the first positioning member 171, and the second recess of the second pivot shaft may be in linear contact with the second positioning member to reduce a friction between the second pivot shaft and the second positioning member.

Figure 9C:
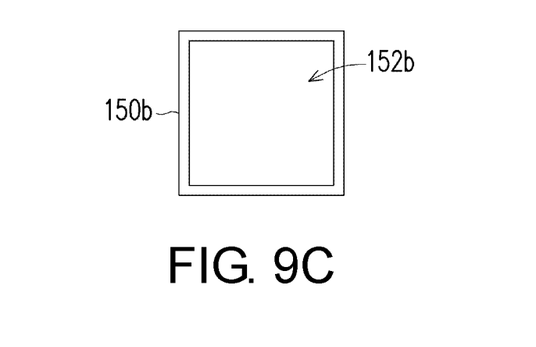
FIG. 9C is a schematic view of a first pivot shaft of an adjustable optical module according to another embodiment of the disclosure along the axial direction.

FIG. 9C is a schematic view of a first pivot shaft of an adjustable optical module according to another embodiment of the disclosure along the axial direction. Referring to FIG. 9C, a main difference between FIG. 9B and FIG. 9C is that: In an embodiment shown in FIG. 9C, a first recess 152b of a first pivot shaft 150b is a polygonal groove. In an embodiment that is not drawn, a second recess of a second pivot shaft may also be a polygonal groove. In the embodiment shown in FIG. 9C, the first recess 152b may be in linear contact with (or point contact with) a first positioning member 171 to reduce a friction between the first pivot shaft 150b and the first positioning member 171, and the second recess of the second pivot shaft may be in linear contact with (or point contact with) the second positioning member to reduce a friction between the second pivot shaft and the second positioning member. Definitely, shapes of the first recess and the second recess are not limited thereto.

Figure 10:
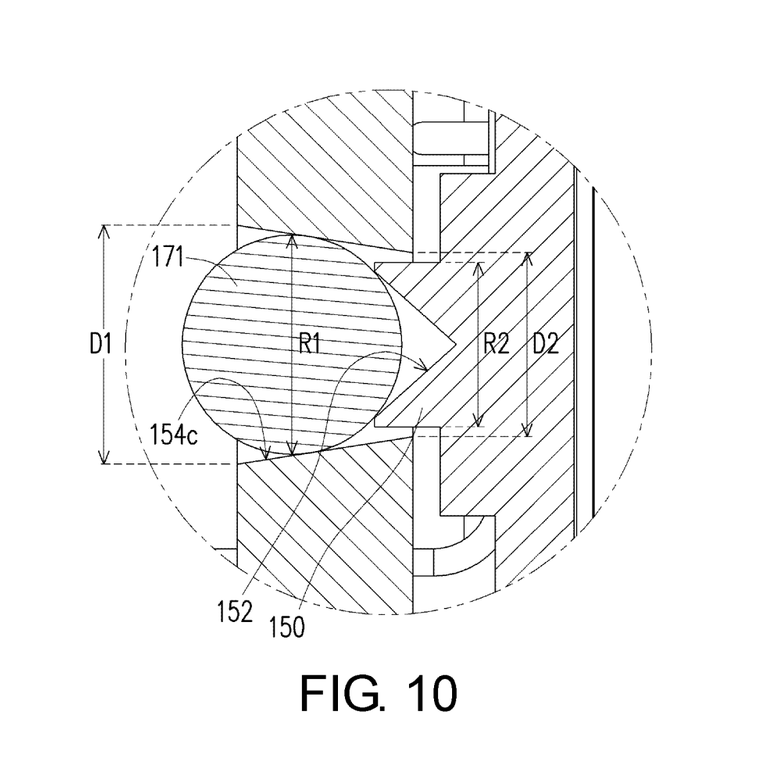
FIG. 10 is a schematic partial cross-sectional view of an adjustable optical module according to an embodiment of the disclosure.

FIG. 10 is a schematic partial cross-sectional view of an adjustable optical module according to an embodiment of the disclosure. Referring to FIG. 10, a main difference between FIG. 10 and FIG. 8A is that: In an embodiment shown in FIG. 10, the first pivot hole 154c is a funnel-shaped hole in a depth direction. Definitely, the second pivot hole may also be a funnel-shaped hole in the depth direction. The first pivot shaft 150 may be in linear contact with an inner wall face of a first pivot hole 154c to reduce a friction between the first pivot shaft 150 and the inner wall face of the first pivot hole 154c, but a shape of the first pivot hole 154c is not limited thereto.

Based on the foregoing, according to the adjustment optical module of the disclosure, the two first positioning members are disposed on the first axis and press against both ends of the two first pivot shafts to maintain the positions of the two first pivot shafts relative to the first pivot holes. In this way, the two first pivot shafts do not move along the radial direction within the two first pivot holes. Similarly, the two second positioning members are disposed on the second axis and press against both ends of the two second pivot shafts, and both ends of the two first positioning members and the two first pivot shafts to maintain the positions of the two second pivot shafts relative to the two second pivot holes. In this way, the two second pivot shafts do not move along the radial direction within the two second pivot holes. Consequently, according to the adjustable optical module of the disclosure, the pivot shaft can be effectively prevented from moving or shaking relative to the pivot hole along the radial direction when the size of the pivot hole is larger than the size of the pivot shaft. Therefore, the adjustable optical module of the disclosure can provide a favorable optical effect.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An adjustable optical module, comprising an optical element, a carrier, a frame, two first positioning members, a base, and two second positioning members, wherein
the carrier is configured to carry the optical element;
one of the carrier and the frame comprises two first pivot shafts that protrude from both sides and extend along a first axis, and the other comprises two first pivot holes, the two first pivot shafts being located in the two first pivot holes, respectively;
the two first positioning members are located on the first axis and press against both ends of the two first pivot shafts;
one of the frame and the base comprises two second pivot shafts that protrude from both sides and extend along a second axis, and the other comprises two second pivot holes, the two second pivot shafts being located in the two second pivot holes, respectively; and
the two second positioning members are located on the second axis and press against both ends of the two second pivot shafts.

2. The adjustable optical module according to claim 1, further comprising:
a first fixing member, fixed to the frame or the carrier that comprises the two first pivot holes and that is aligned with one of the two first pivot holes, wherein one of the two first positioning members is located between the first fixing member and the corresponding first pivot shaft, and the first fixing member presses the corresponding first positioning member against the end of the corresponding first pivot shaft; and
a first cantilever, one end of the first cantilever being fixed to the frame or the carrier that comprises the two first pivot holes and corresponding to the other of the two first pivot holes, the other of the two first positioning members being located between the first cantilever and the corresponding first pivot shaft, and the first cantilever pressing the corresponding first positioning member against the end of the corresponding first pivot shaft.

3. The adjustable optical module according to claim 2, wherein the first fixing member comprises a first plate and a second plate that in bent connection, an included angle between the first plate and the second plate being between 70 degrees and 90 degrees, and the first positioning member pressed by the first fixing member being in contact with the first plate and the second plate.

4. The adjustable optical module according to claim 1, further comprising:
a second fixing member, fixed to the frame or the base that comprises the two second pivot holes and aligned with one of the two second pivot holes, wherein one of the two second positioning members is located between the second fixing member and the corresponding second pivot shaft, and the second fixing member presses the corresponding second positioning member against the end of the corresponding second pivot shaft; and
a second cantilever, one end of the second cantilever being fixed to the frame or the base that comprises the two second pivot holes and being aligned with the other of the two second pivot holes, wherein the other of the two second positioning members is located between the second cantilever and the corresponding second pivot shaft, and the second cantilever presses the corresponding second positioning member against the end of the corresponding second pivot shaft.

5. The adjustable optical module according to claim 4, wherein the second fixing member comprises a third plate and a fourth plate in bent connection, an included angle between the third plate and the fourth plate being between 70 degrees and 90 degrees, and the second positioning member pressed by the second fixing member being in contact with the third plate and the fourth plate.

6. The adjustable optical module according to claim 1, wherein each of the first positioning members and/or each of the second positioning members are/is sphere-shaped.

7. The adjustable optical module according to claim 1, wherein
one of the two first pivot holes is an annular hole with closed edges, and the other is a horseshoe-shaped hole with non-closed edges, and/or
one of the two second pivot holes is an annular hole with closed edges, and the other is a horseshoe-shaped hole with non-closed edges.

8. The adjustable optical module according to claim 1, wherein
each of the first pivot holes is a stepped hole or a funnel-shaped hole in a depth direction, the first positioning member being located in the first pivot hole, and/or
each of the second pivot holes is a stepped hole or a funnel-shaped hole in a depth direction, the second positioning member being located in the second pivot hole.

9. The adjustable optical module according to claim 1, wherein
each of the first pivot holes is a stepped hole in a depth direction and comprises a first hole section and a second hole section, wherein the first hole section and the second hole section comprise a first inner diameter and a second inner diameter, respectively, and
the first positioning member corresponding to the first pivot hole is located in the first pivot hole, an outer diameter of the first positioning member being less than the first inner diameter of the first hole section and greater than the second inner diameter of the second hole section.

10. The adjustable optical module according to claim 9, wherein
an outer diameter of each of the first pivot shafts is smaller than the second inner diameter of the second hole section of the corresponding first pivot hole, and each of the first pivot shafts is located in the second hole section of the corresponding first pivot hole.

11. The adjustable optical module according to claim 1, wherein
each of the second pivot holes is a stepped hole in a depth direction and comprises a third hole section and a fourth hole section, wherein the third hole section and the fourth hole section comprise a third inner diameter and a fourth inner diameter, respectively, and
the second positioning member corresponding to the second pivot hole is located in the second pivot hole, an outer diameter of the second positioning member being less than the third inner diameter of the third hole section and greater than the fourth inner diameter of the fourth hole section.

12. The adjustable optical module according to claim 11, wherein an outer diameter of each of the second pivot shafts is smaller than the fourth inner diameter of the fourth hole section of the corresponding second pivot hole, and each of the second pivot shafts is located in the fourth hole section of the corresponding second pivot hole.

13. The adjustable optical module according to claim 1, wherein
the end of each of the first pivot shafts comprises a first recess, and the first positioning member is partially located in the first recess, the first recess being a funnel-shaped groove, a circular groove, or a polygonal groove, and/or
the end of each of the second pivot shafts comprises a second recess, and the second positioning member is partially located in the second recess, the second recess being a funnel-shaped groove, a circular groove, or a polygonal groove.

14. A projector, comprising a light source module, a light valve, a projection lens, and an adjustable optical module, wherein
the light source module is configured to emit an illuminating light beam;
the light valve is configured to convert the illuminating light beam into an image light beam;
the projection lens is configured to project the image light beam; and
the adjustable optical module is disposed on a path of the illuminating light beam or a path of the image light beam, and the adjustable optical module comprises an optical element, a carrier, a frame, two first positioning members, a base, and two second positioning members, wherein
the carrier is configured to carry the optical element;
one of the carrier and the frame comprises two first pivot shafts that protrude from both sides and extend along a first axis, and the other comprises two first pivot holes, the two first pivot shafts being located in the two first pivot holes, respectively;
the two first positioning members are located on the first axis and press against both ends of the two first pivot shafts;
one of the frame and the base comprises two second pivot shafts that protrude from both sides and extend along a second axis, and the other comprises two second pivot holes, the two second pivot shafts being located in the two second pivot holes, respectively; and
the two second positioning members are located on the second axis and press against both ends of the two second pivot shafts.

15. The projector according to claim 14, wherein the adjustable optical module further comprises:
a first fixing member, fixed to the frame or the carrier that comprises the two first pivot holes and aligned with one of the two first pivot holes, wherein one of the two first positioning members is located between the first fixing member and the corresponding first pivot shaft, and the first fixing member presses the corresponding first positioning member against the end of the corresponding first pivot shaft; and
a first cantilever, one end of the first cantilever being fixed to the frame or the carrier that comprises the two first pivot holes and being aligned with the other of the two first pivot holes, the other of the two first positioning members being located between the first cantilever and the corresponding first pivot shaft, and the first cantilever pressing the corresponding first positioning member against the end of the corresponding first pivot shaft.

16. The projector according to claim 15, wherein the first fixing member comprises a first plate and a second plate in bent connection, an included angle between the first plate and the second plate being between 70 degrees and 90 degrees, and the first positioning member pressed by the first fixing member being in contact with the first plate and the second plate.

17. The projector according to claim 14, wherein the adjustable optical module further comprises:
a second fixing member that is fixed to the frame or the base that comprises the two second pivot holes and that is aligned with one of the two second pivot holes, wherein one of the two second positioning members is located between the second fixing member and the corresponding second pivot shaft, and the second fixing member presses the corresponding second positioning member against the end of the corresponding second pivot shaft; and
a second cantilever, one end of the second cantilever being fixed to the frame or the base that comprises the two second pivot holes and being aligned with the other of the two second pivot holes, wherein the other of the two second positioning members is located between the second cantilever and the corresponding second pivot shaft, and the second cantilever presses the corresponding second positioning member against the end of the corresponding second pivot shaft.

18. The projector according to claim 17, wherein the second fixing member comprises a third plate and a fourth plate in bent connection, an included angle between the third plate and the fourth plate being between 70 degrees and 90 degrees, and the second positioning member pressed by the second fixing member being in contact with the third plate and the fourth plate.

19. The projector according to claim 14, wherein each of the first positioning members and/or each of the second positioning members are/is sphere-shaped.

20. The projector according to claim 14, wherein
one of the two first pivot holes is an annular hole with closed edges, and the other is a horseshoe-shaped hole with non-closed edges, and/or
one of the two second pivot holes is an annular hole with closed edges, and the other is a horseshoe-shaped hole with non-closed edges.

21. The projector according to claim 14, wherein
each of the first pivot holes is a stepped hole or a funnel-shaped hole in a depth direction, the first positioning member being located in the first pivot hole, and/or
each of the second pivot holes is a stepped hole or a funnel-shaped hole in a depth direction, the second positioning member being located in the second pivot hole.

22. The projector according to claim 14, wherein
each of the first pivot holes is a stepped hole in a depth direction and comprises a first hole section and a second hole section, wherein the first hole section and the second hole section comprise a first inner diameter and a second inner diameter, respectively, and
the first positioning member corresponding to the first pivot hole is located in the first pivot hole, an outer diameter of the first positioning member being less than the first inner diameter of the first hole section and greater than the second inner diameter of the second hole section.

23. The projector according to claim 22, wherein an outer diameter of each of the first pivot shafts is smaller than the second inner diameter of the second hole section of the corresponding first pivot hole, and each of the first pivot shafts is located in the second hole section of the corresponding first pivot hole.

24. The projector according to claim 14, wherein each of the second pivot holes is a stepped hole in a depth direction and comprises a third hole section and a fourth hole section, wherein the third hole section and the fourth hole section comprise a third inner diameter and a fourth inner diameter, respectively, and the second positioning member corresponding to the second pivot hole is located in the second pivot hole, an outer diameter of the second positioning member being less than the third inner diameter of the third hole section and greater than the fourth inner diameter of the fourth hole section.

25. The projector according to claim 24, wherein an outer diameter of each of the second pivot shafts is smaller than the fourth inner diameter of the fourth hole section of the corresponding second pivot hole, and each of the second pivot shafts is located in the fourth hole section of the corresponding second pivot hole.

26. The projector according to claim 14, wherein the end of each of the first pivot shafts comprises a first recess, and the first positioning member is partially located in the first recess, the first recess being a funnel-shaped groove, a circular groove, or a polygonal groove, and/or the end of each of the second pivot shafts comprises a second recess, and the second positioning member is partially located in the second recess, the second recess being a funnel-shaped groove, a circular groove, or a polygonal groove.

* * * * *